(12) United States Patent
Gebauer et al.

(10) Patent No.: US 12,044,663 B2
(45) Date of Patent: Jul. 23, 2024

(54) METHOD AND APPARATUS FOR PACKING A CHROMATOGRAPHY COLUMN ASSEMBLY

(71) Applicant: Cytiva BioProcess R&D AB, Uppsala (SE)

(72) Inventors: Klaus Gebauer, Uppsala (SE); Dan Hermansson, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 742 days.

(21) Appl. No.: 16/067,628

(22) PCT Filed: Jan. 6, 2017

(86) PCT No.: PCT/EP2017/050279
§ 371 (c)(1),
(2) Date: Jul. 2, 2018

(87) PCT Pub. No.: WO2017/118741
PCT Pub. Date: Jul. 13, 2017

(65) Prior Publication Data
US 2019/0154639 A1    May 23, 2019

(30) Foreign Application Priority Data
Jan. 6, 2016    (GB) ..................... 1600171

(51) Int. Cl.
*G01N 30/60*    (2006.01)
*B01D 15/20*    (2006.01)
(Continued)

(52) U.S. Cl.
CPC ....... *G01N 30/6004* (2013.01); *B01D 15/206* (2013.01); *B01D 15/22* (2013.01);
(Continued)

(58) Field of Classification Search
None
See application file for complete search history.

(56) References Cited

U.S. PATENT DOCUMENTS

| | | | |
|---|---|---|---|
| 4,549,584 A | 10/1985 | Morin et al. | |
| 5,021,162 A | 6/1991 | Sakamoto et al. | |

(Continued)

FOREIGN PATENT DOCUMENTS

| | | |
|---|---|---|
| CN | 101622044 A | 1/2010 |
| CN | 103071313 A | 5/2013 |

(Continued)

OTHER PUBLICATIONS

Chinese Office Action for CN Application No. 201780015374.2 mailed Mar. 18, 2020 (31 pages with English translation).

(Continued)

*Primary Examiner* — Kara M Peo
(74) *Attorney, Agent, or Firm* — Eversheds Sutherland (US) LLP

(57) ABSTRACT

A method for packing a chromatography column with chromatography media, comprising the steps of: providing a system comprising a column tube (3,19,21) having a closed first end (5) comprising an inlet/outlet (7), a media inlet (15) adjacent a second end of the column tube and an adaptor (9) positioned inside the column tube initially adjacent the second end of the column tube for sliding and sealing contact with an inner face of the column tube, the column tube and adaptor arranged initially such that they define an internal volume and such that the media inlet is in fluid connection with the internal volume; connecting a media slurry source to the media inlet; at least partially filling the internal volume with media slurry via the media inlet; forcing the adaptor towards the first end of the column tube (Continued)

to reduce the internal volume such that the media inlet is no longer in fluid connection with the reduced internal volume.

8 Claims, 4 Drawing Sheets

(51) Int. Cl.
*B01D 15/22* (2006.01)
*G01N 30/56* (2006.01)

(52) U.S. Cl.
CPC ....... *G01N 30/56* (2013.01); *G01N 2030/565* (2013.01); *G01N 30/6021* (2013.01); *G01N 30/606* (2013.01)

(56) References Cited

U.S. PATENT DOCUMENTS

| | | | |
|---|---|---|---|
| 5,169,522 | A | 12/1992 | Shalon et al. |
| 5,310,322 | A | 5/1994 | Richards |
| 5,610,232 | A | 3/1997 | Unger et al. |
| 6,558,539 | B1 | 5/2003 | Mann |
| 8,607,829 | B2 | 12/2013 | Williams et al. |
| 8,778,187 | B2 | 7/2014 | Gebauer |
| 2013/0062267 | A1 | 3/2013 | Gebsuer |

FOREIGN PATENT DOCUMENTS

| | | |
|---|---|---|
| CN | 203643412 U | 6/2014 |
| DE | 10029142 A1 | 1/2002 |
| EP | 1164373 A2 | 12/2001 |
| EP | 2324898 A2 | 5/2011 |
| GB | 2447344 A | 9/2008 |
| JP | 2004045309 A | 2/2004 |
| JP | 4018467 B2 | 12/2007 |
| JP | 2011214880 A | 10/2011 |
| JP | 2011214985 A | 10/2011 |
| JP | 2012194047 A | 10/2012 |
| JP | 2013015492 A | 1/2013 |
| KR | 101017572 B1 | 2/2011 |
| WO | 2004/103517 A1 | 12/2004 |
| WO | 2013/126405 A1 | 8/2013 |

OTHER PUBLICATIONS

PCT International Search Report and Written Opinion for PCT Application No. PCT/EP2017/050279 mailed Mar. 31, 2017 (11 pages).
GB Search Report for GB Application No. 1600171.1 mailed Oct. 24, 2016 (5 pages).
Japanese Office Action for JP Application No. 2018-535016 mailed Sep. 14, 2020 (7 pages with English translation).
Chinese Office Action for CN Application No. 202111358203.4 mailed Apr. 10, 2024 (26 pages with English translation).

METHOD AND APPARATUS FOR PACKING A CHROMATOGRAPHY COLUMN ASSEMBLY

CROSS REFERENCE TO RELATED APPLICATIONS

This application claims the priority benefit of PCT/EP2017/050279 filed on Jan. 6, 2017 which claims priority benefit of Great Britain Application No. 1600171.1 filed Jan. 6, 2016. The entire contents of which are hereby incorporated by reference herein.

TECHNICAL FIELD OF THE INVENTION

The present invention relates to a method and apparatus for packing a chromatography column with chromatography media. It further relates to a chromatography column packed with chromatography media according to this method and to an extension tube wall used during this packing method.

BACKGROUND OF THE INVENTION

In chromatography the use of single use chromatography columns is now very common. In a single use chromatography column the media is pre-packed by the supplier before the column is delivered to the customer, in contrast to traditional columns that are packed by the customer at the point of use. Single-use columns are pre-packed for ease of use and can readily be deployed by the customer. As with other single use technology, the columns are intended to be used under a limited number of process cycles and/or campaigns in a dedicated process. Single use products eliminate the need for cleaning of equipment prior and after use and related labor, validation and quality control efforts. Also, single-use products can be manufactured and supplied to meet pre-defined requirements on quality control, product properties and performance. There are various techniques for packing of chromatography columns including flow packing, pressure packing etc. The best and most reproducible results on basis of a generic and automatically controllable method are typically achieved with axial compression packing technologies, where the slurry (suspension) is introduced into the column space in a first step and the packed bed is formed and partly compressed by movement of the adapter in a second step. In axial compression packing, the media slurry is a suspension of the media with a typical slurry concentration of 40-70%. Hereby, a long column tube is required during the packing procedure, but after packing often more than half the height of the column tube is just empty.

SUMMARY

An object of the present invention is to provide an improved method and apparatus for packing a chromatography column.

This is achieved in a method for packing a chromatography column assembly with chromatography media, comprising the steps of:

providing a system comprising a column tube having a closed first end comprising an inlet/outlet, a media inlet adjacent a second end of the column tube and an adaptor positioned inside the column tube initially adjacent the second end of the column tube for sliding and sealing contact with an inner face of the column tube, the column tube and adaptor arranged initially such that they define an internal volume and such that the media inlet is in fluid connection with the internal volume;

connecting a media slurry source to the media inlet;

at least partially filling the internal volume with media slurry via the media inlet;

forcing the adaptor towards the first end of the column tube to reduce the internal volume such that the media inlet is no longer in fluid connection with the reduced internal volume.

This is also achieved by a chromatography column assembly comprising:

a column tube having a closed first end comprising an inlet/outlet, and a media inlet adjacent a second end of the column tube connectable to a media slurry source; and an adaptor positionable in a first position inside the column tube adjacent the second end of the column tube for sliding and sealing contact with an inner face of the column tube; the column tube and adaptor when arranged in said first position defining an internal volume where the media inlet is in fluid connection with the internal volume; the adaptor being moveable at least to a second position to reduce the internal volume, in which second position the media inlet is no longer in fluid connection with the reduced internal volume.

Hereby a closed system can be provided for the packing method. This will provide a possibility to perform the packing process aseptically. If pre-sterilized components and pre-sterilized media slurry is used and aseptic connectors are used for connections the whole packing method can be performed aseptically. Hereby an aseptic, single use, pre-packed chromatography column can be provided. Herein, the terms aseptic, sterile and similar wording are intended to encompass a range of cleanliness from completely sterile (no bioburden or other contaminants) to a clean state where a tolerably low level of bioburden or contamination is present within the closed system effected by a controlled packing environment.

This object is also achieved by an extension tube wall arranged to be connected to a basic column tube wall of a chromatography column during packing of the chromatography column according to this method. Said extension tube wall comprises a media inlet.

A further object of the invention is to provide a chromatography column packed with chromatography media. This is achieved by a chromatography column packed with chromatography media according to this method.

According to one embodiment of the invention the method comprises providing the system and the media slurry as pre-sterilized and providing aseptic and/or sanitary connectors to the media inlet, the first end inlet/outlet and/or the adaptor inlet/outlet.

In an embodiment, the column assembly and its packing apparatus may be disassembled, optionally leaving fluid paths only for connection to a further column, thus minimizing the parts of the packing apparatus that are exposed to an environment outside the closed system. Hereby a method for packing a single use chromatography column where the packed chromatography column is aseptic is achieved.

According to one embodiment of the invention the method further comprises the step of after forcing the adaptor towards the first end of the column tube separating the empty part of the column tube left above the adaptor from the rest of the column.

Hereby a packed aseptic single use chromatography column is provided without a column tube extending over the packed bed.

According to one embodiment of the invention the step of providing a system further comprises connecting an extension tube wall to a basic column tube wall, both having essentially the same inner diameters and connected they form the column tube and the step of forcing the adaptor towards the first end of the column tube comprises forcing the adaptor to a position within the basic column tube wall but outside the extension tube wall and the step of separating the empty part of the column tube comprises disconnecting the extension tube wall from the basic column tube wall.

Hereby a convenient method for separating the empty part of the column tube left above the adaptor from the rest of the column is achieved.

DETAILED DESCRIPTION OF THE EMBODIMENTS

Figure 1A:
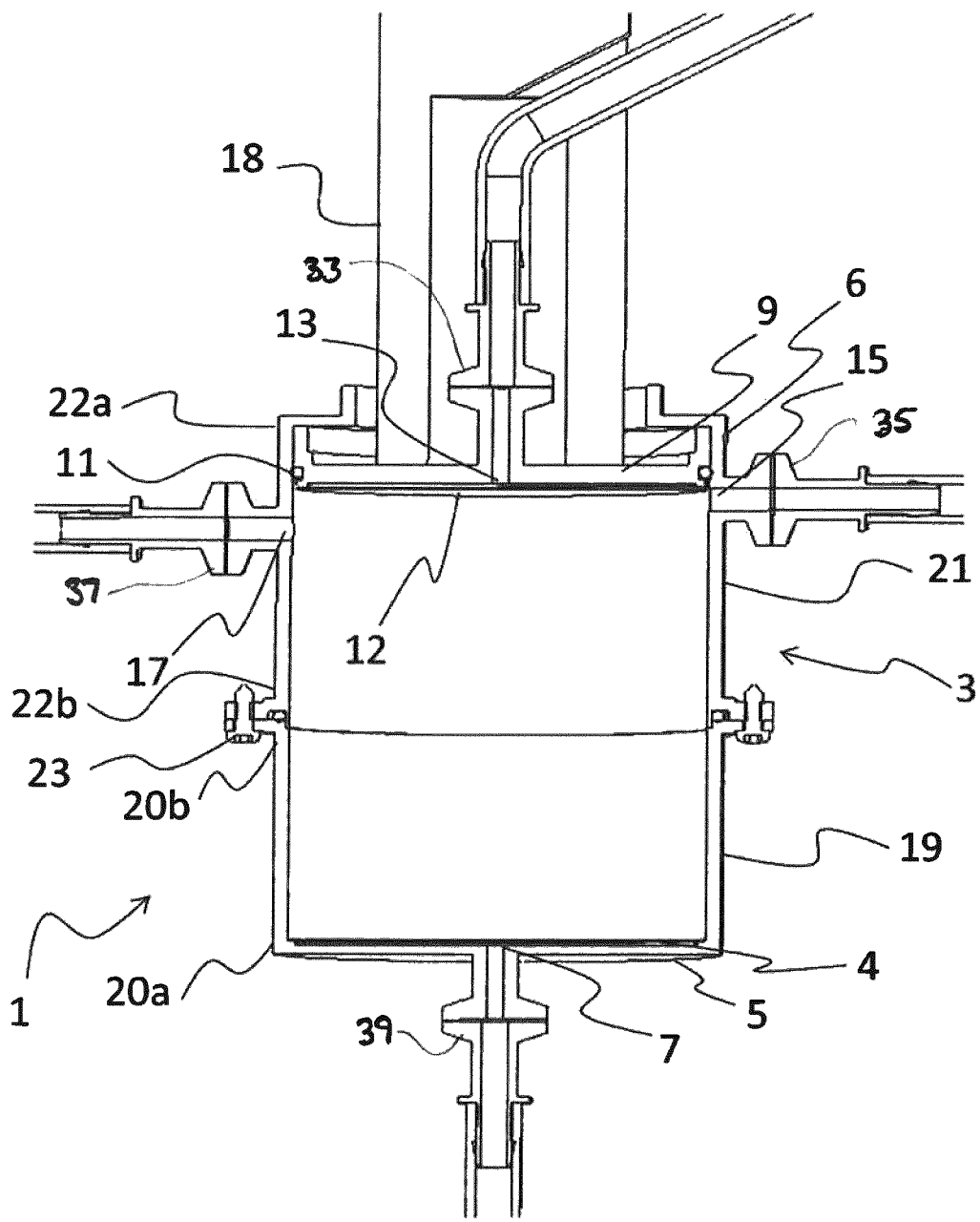
FIG. 1a shows in cross section a chromatography column according to one embodiment of the invention in a first step of a packing procedure.

FIG. 1a shows in cross section a chromatography column assembly 1 according to one embodiment of the invention in a first step of a packing procedure. The chromatography column 1 comprises a column tube 3 having a closed first end 5. Said first end 5 comprises a first bed support 4 and an inlet/outlet 7. An adaptor 9 is positioned inside the column tube 3 and in this first step of the packing procedure adjacent a second end 6 of the column tube for sliding and sealing contact with an inner face of the column tube. The column tube 3 and adaptor 9 are arranged such that they define an internal volume and such that a media inlet 15 provided in the column tube adjacent the second end 6 in this first step of the packing procedure is in fluid connection with the internal volume. The adaptor 9 is positioned inside the column tube 3 and has almost the same diameter as the inner diameter of the column tube 3. The adaptor 9 further comprises a seal 11 such that a leak proof connection between the adaptor and the innerface of the column tube 3 is provided. Still the adaptor can be moved along the inner surface of the column tube 3. The adaptor comprises a second bed support 12 and an inlet/outlet 13. In this shown embodiment of the invention an air outlet 17 is also provided in the column tube 3. The air outlet is also provided adjacent the second end 6 of the column tube 3. The air outlet 17 can be provided at the same height position as the media inlet 15 on the column tube 3 or slightly beneath the position of the media inlet 15, in order to increase to media filling rate. In another embodiment of the invention no separate air outlet is needed because the inlet/outlet 13 in the adaptor 9 can be used for taking out air. It will be appreciated that the outlet 17 and the inlet/outlet 13 cab be used together. Further, air remaining in the upper column space after the filling with slurry can possibly also be taken out additionally or solely through the media inlet 15, which would allow displacement of remaining slurry in the adjacent media inlet tubing and thereby recover remaining slurry.

A compression frame 18 is connected to the adaptor 9. In the embodiment shown in FIG. 1a the compression frame 18 is arranged around the adaptor inlet/outlet 13. The compression frame 18 is arranged to control the movement of the adaptor 9 such that the adaptor can be forced towards the first end 5 of the column tube 3 during packing.

In one embodiment of the invention as shown in FIG. 1a the column tube 3 is divided into two parts, a basic column tube wall 19 and an extension tube wall 21. A first end 20a of the basic column tube wall 19 is provided with the closed first end 5. A second end 20b of the basic column tube wall 19 will be connected to the extension tube wall 21. The basic tube wall 19 and the extension tube wall 21 have essentially the same inner diameters and are during packing of the column connected to each other by a connection means 23. This could be achieved by clamping or mechanical interlocking using screws, bayonets or locking elements. During a first step of the packing method of the invention, i.e. during a step of the method where media slurry is filled into the column, the adaptor 9 is provided close to an upper end 22a of the extension tube wall 21 (also referred to as the second end 6 of the column tube 3). A lower end 22b of the extension tube wall 21 is connected to the second end 20b of the basic column tube wall 19.

Herein, the column assembly 1 includes the column 3 and its associated ports 13,15,17 and 7, as well as the adapter 9, and the filters 12 and 4. The column packing apparatus includes the compression frame 18, and, not shown: pumps; control means; and fluid supply/egress paths. The packing apparatus is disconnectable from the column assembly 1 at selected connectors 33, 35, 37 and 39, leavening the fluid paths to the column assembly closed and, apart from the ends of the connectors 33, 35, 37 and 39, free of contamination. Valves at or adjacent the connectors 33,35 37 and 39 will assist in keep the fluid paths closed.

Figure 3:
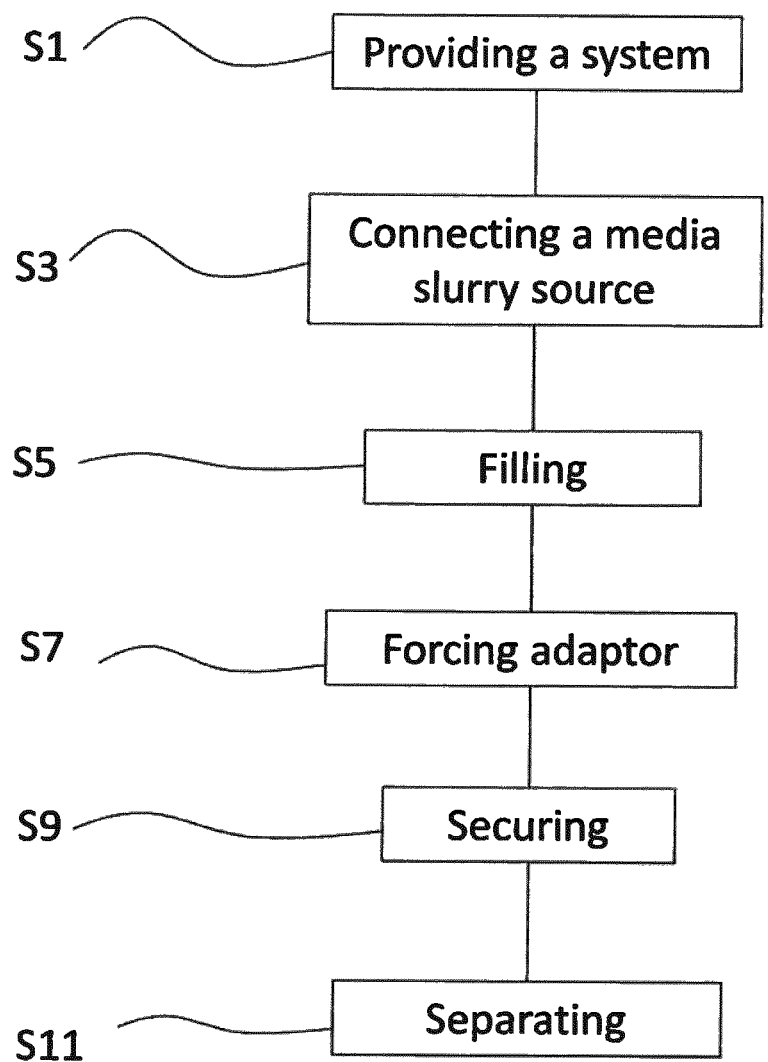
FIG. 3 is a flow chart of a method according to one embodiment of the invention.

According to the invention a method for packing a chromatography column with chromatography media is provided. A flow chart describing the steps of the method is shown in FIG. 3 and the steps will be described below:

S1: Providing a system comprising a column tube 3 having a closed first end 5 comprising an inlet/outlet 7, a media inlet 15 adjacent a second end 6 of the column tube 3 and an adaptor 9 positioned inside the column tube 3 initially adjacent the second end 6 of the column tube 3 for sliding and sealing contact with an inner face of the column tube, the column tube 3 and adaptor 9 arranged initially such that they define an internal volume and such that the media inlet 15 is in fluid connection with the internal volume.

S3: Connecting a media slurry source to the media inlet 15.

S5: Filling the internal volume defined by the column tube 3 and the adaptor 9 with media slurry. In one embodiment of the invention this step comprises filling this internal volume with an exact amount of media slurry and in another embodiment of the invention this step comprises filling the internal volume with media slurry until media slurry is starting to flow out from the air outlet 17 if an air outlet 17 is provided. An advantage with this latter method is that the media slurry volume provided into the column does not need to be measured but is determined by the volume determined by the geometry of the system, which can be adequately controlled. Thus the exact volume of media slurry provided into the column will still be known based on a measured volume of the internal volume in the column tube below the air outlet 17.

Removal of air in between the adapter and the surface of the slurry can suitably be provided. This can be performed by for example extracting air through an air outlet 17 (if an air outlet is provided in the system) or through the adaptor inlet/outlet 13 during or after the slurry filling or after the slurry filling through the media inlet 15.

In one embodiment a priming step is performed before the step of filling the internal volume with media slurry, step S5. A priming liquid could then be provided to the first bed support 4 for priming the first bed support. The priming of a bed support is in order to wet it and/or remove air from it. Either the priming liquid added to the first bed support can be removed through the outlet/inlet 7 before slurry is filled into the column or the volume of the priming liquid provided to the bed support can be taken into consideration when determining how much media slurry that should be provided into the column during step S5.

S7: Forcing the adaptor 9 towards the first end 5 to reduce the internal volume such that the media inlet 15 (and the air outlet 17, if an air outlet is provided in the system) is (are) no longer in fluid connection with the reduced internal volume of the column defined by the column tube 3 and the adaptor 9. According to one embodiment of the invention a position where the adaptor should be stopped can be calculated by using the media slurry concentration, the amount of media slurry filled into the closed system and a wanted compression factor.

The axial compression packing method and the movement of the adapter 9 towards the first end 5 facilitates the formation of the packed bed as a porous structure in a first step and subsequently a further mechanical compression of this porous structure in order to provide a stable and robust packed bed of good chromatographic efficiency. In both steps, excess liquid is removed at the inlet/outlet 7 at the closed first end 5 of the column tube 3. In general, the volume of the media slurry and the slurry concentration is needed for calculating how much the adaptor 9 should be forced down during the packing method for achieving a correct compression factor. A compression factor is defined as the inverse of the relative volumetric compression of a settled bed of porous media achieved by the axial compression of the adapter. In other words the compression factor is the volume of sedimented (uncompressed) media divided by the finally packed bed volume where the media is found in a mechanically compressed state. A typical compression factor ensuring sufficient stability and performance during operation can be in range of 1.05-1.2.

Alternatively, the exact concentration of media slurry and/or the volume of slurry can be adjusted to achieve a correct compression factor for a desired final bed height and final adapter position.

In the embodiment of the invention where the column tube 3 is divided into two parts, a basic column tube wall 19 and an extension tube wall 21, the adaptor 9 will in this step be forced into the basic column tube wall 19.

S9: In one embodiment of the invention the adaptor 9 is secured to the column tube 3 (being the basic column tube wall 19 in the embodiment where the column tube 3 is divided into two parts). The adaptor can be secured to the column tube by welding, clamping or mechanical interlocking using screws, bayonets or locking elements. Additional elements could be employed to accommodate this.

In one embodiment the adapter is secured in the column by a press fit, for example by having the tube wall in a lower segment (referring to the directions in the drawings 1a, 1b) of the tube designed with smaller diameter than an upper segment of the tube such that the adapter is forced and clamped into the lower tube when approaching the final adapter position. This press-fit could be designed strong enough to accommodate a final securement of the adapter that is capable of taking the full load and fluid pressure during the use of the column in the end users process. In another embodiment, the securing of the adapter could be a temporary securement and the final securement could be performed in a subsequent step. The final, second step of securement could be accomplished using a different method of securing the adapter, however, it could also be accomplished using the same method of securing but by applying a different, additional or extended force, displacement or other suitable action required.

S11: In one embodiment of the invention the next step of the method is to separate the empty part of the column tube left above the adaptor 9 from the rest of the column. In the embodiment where the column tube 3 is divided into two parts the extension tube wall 21 is disconnected from the basic column tube wall 19.

According to one embodiment of the invention the closed system and the media slurry is provided as pre-sterilized and aseptic and/or sanitary connectors are provided to at least all inlets and outlets engaged during the packing method, such as at least the media inlet, the first end inlet/outlet and/or the adaptor inlet/outlet. Hereby the packing method can be provided as an aseptic packing method in a closed system and the packed chromatography column can be provided as a sterile column as the result of the aseptic packing method.

According to a further embodiment, the sterile column resulting from the aseptic packing process can be provided with further aseptic connectors that are to be engaged aseptically when connecting the column to the processing equipment at the point of use. In case that the same inlets and/or outlets of the column are used during both packing method and final processing, two or more aseptic connectors can be provided for each of the respective inlets and/or outlets of the column. For each of said inlets and/or outlets equipped with more than one aseptic connector, a valve mechanism or manifold means can be provided to switch in between the more than one connectors and connected lines. For example, inlet/outlet 7 may be employed during the column packing procedure by connecting to one aseptic connector. This connector could then be closed off and separated by a valve. Said valve could be configured to engage another (fresh) aseptic connector that connects to processing equipment when the column is used later on for processing.

In another embodiment, welding methods may be employed instead of connectors or disconnectors to accommodate the aseptic connection functionality. Welding methods could further be used to accomplish a closure of a fluid path and/or a disconnection, for example in between the column and a connector of a fluid path. Further, aseptic disconnectors may be used to disconnect sterile fluid lines, for example disconnect the column from the packing system after the packing process.

In a preferred embodiment, the system and chromatography media are provided pre-sterilized to accomplish a pre-sterilized packed column by means of the aseptic packing process. In another embodiment, the system and/or chromatography media are not provided pre-sterilized, but preferably in a known and controlled condition and status for bioburden. In the latter embodiment, the closed system will enable to maintain the known and controlled condition and status for the components and in especially the chromatography medium packed inside the column volume. A sterilization of the packed column, for example by gamma irradiation, will be possible and facilitated by the closed packing system.

In another embodiment, the packed column may be tested and qualified after packing, for example by residence time analysis and/or characterization of hydraulic permeability, to establish a certificate of analysis. If the column has been prepared from pre-sterilized components under aseptic conditions, then the testing is preferably performed using pre-sterilized of sterile-filtered solutions to maintain sterility. For connecting test equipment and test fluids to the system, said multiple aseptic connections and connectors can be connected to the inlets and/or outlets of the system.

In a further embodiment, the column is packed in the closed system, sterilized in a subsequent step and then tested and/or qualified under aseptic conditions in a subsequent step prior to use in processing, for example biopharmaceutical production.

In one embodiment of the invention all parts of the column that are in fluid contact and suitably also the connectors provided to the column are sanitary, which means that the design will facilitate efficient cleaning and sanitization. This will provide a possibility to effectively flush the column with a bacteriostatic storage solution prior to shipping and/or storage or to clean the column, store and reuse it over a number of processing cycles and/or campaigns.

Figure 1B:
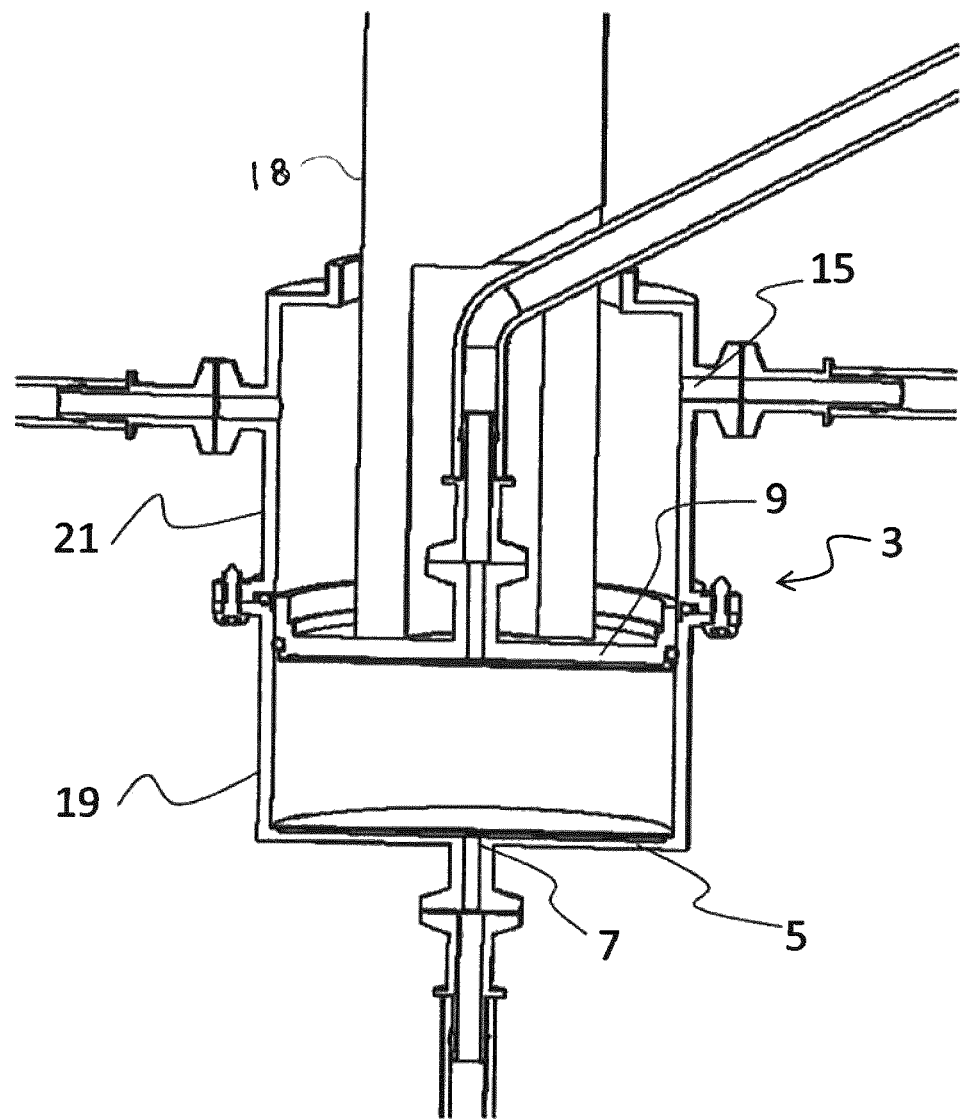
FIG. 1b shows in cross section the chromatography column of FIG. 1a in a second step of a packing procedure.

FIG. 1b shows in cross section the chromatography column of FIG. 1a in a second step of the packing procedure. Here it can be seen that the adaptor 9 has been forced down towards the first end 5 of the column tube 3. In this embodiment the column tube 3 is divided into a basic column tube wall 19 and an extension tube wall 21 and in this embodiment the adaptor 9 will be forced to a position within the basic column tube wall 19 but outside the extension tube wall 21. Hereby also the media inlet 15 will be passed by the adaptor 9 and the media inlet 15 will no longer be in fluid connection with the internal volume of the column defined by the column tube 3 and the adaptor 9. The distance the adaptor 9 should be forced down and thus the final height of the packed bed can in one embodiment be calculated by using the media slurry concentration, the amount of media slurry filled into the closed system and a wanted compression factor. Hereby a correctly packed bed of media will be achieved. By adjusting the media slurry concentration and/or the amount of media slurry filled into the closed system, the final adaptor position and packed bed height can be adjusted to the height of the basic column tube 19 such that the adaptor 9 after packing always will end up inside and in height of the basic column tube wall 19 and outside the extension tube wall 21. Hereby, a correctly packed bed can always be achieved with a wanted final bed height. Suitably, the excess liquid from the slurry will leave the column through the inlet/outlet 7 in the first end 5 during the downward movement of the adaptor 9, i.e. during the packing process. The next step after packing and when the adaptor 9 is in a correct positon within the basic column tube wall 19 is to secure the adaptor to the column tube as described above and to disconnect the extension tube wall 21 from the basic column tube wall 19. In another embodiment the column tube 3 is not divided into two parts and in that case the part of the column tube 3 being left above the adaptor 9 after packing can be simply cut off.

Figure 2A:
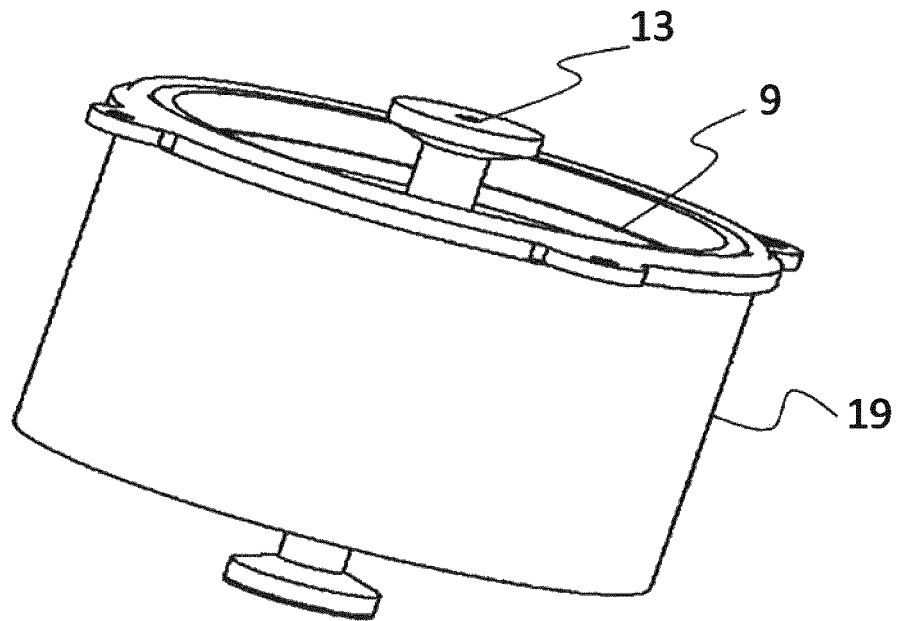
FIG. 2a shows a perspective view of a single use chromatography column packed by a method according to one embodiment of the invention.

FIG. 2a shows a perspective view of a single use chromatography column packed by a method according to one embodiment of the invention. This embodiment of the invention is a chromatography column packed by the method shown in relation to FIGS. 1a and 1b. Here the extension tube wall 21 has been disconnected. The basic column tube wall 19 can be seen and the adaptor 9 with its inlet/outlet 13.

Figure 2B:
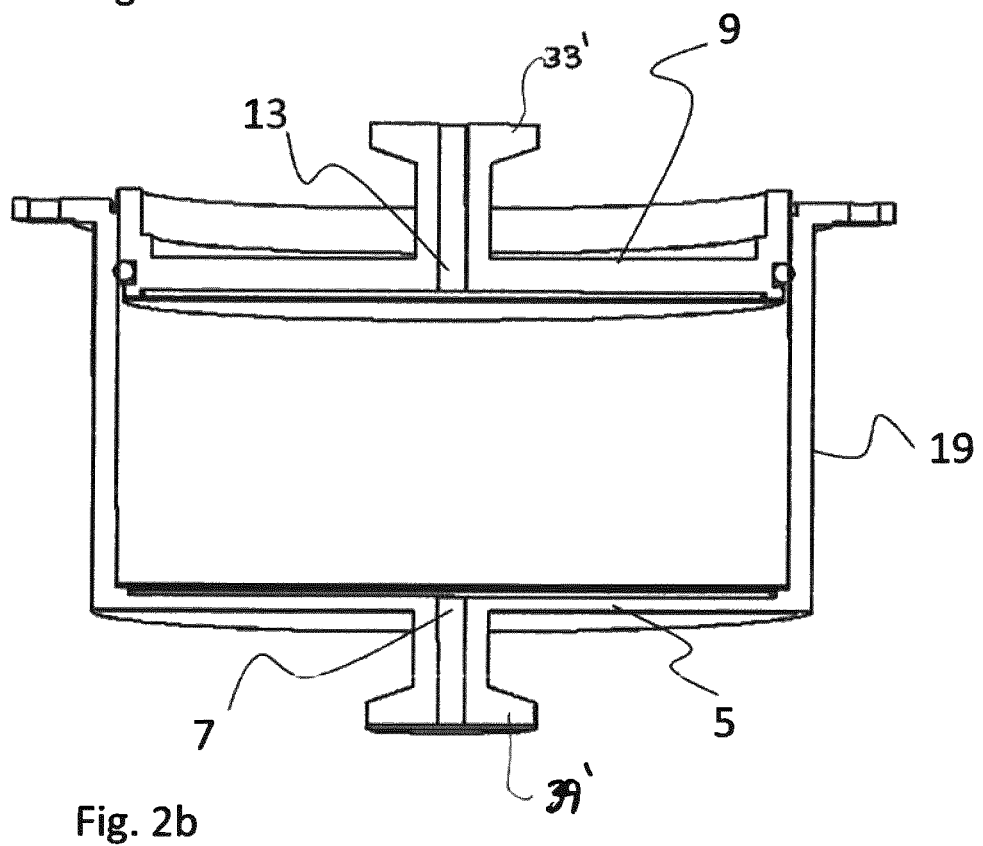
FIG. 2b shows the single use chromatography column of FIG. 2a in cross section.

FIG. 2b shows the single use chromatography column of FIG. 2a in cross section.

In order to maintain the sterility of the now pre-packed column shown in FIGS. 2a and 2b, it is envisaged that the now disconnected connections 33' and 39' at the ports 7 and 13 will have integral valves, for example a simple sliding gate valve could be used, or rotatable spindle two or three way valves. In addition to the valves, or as an alternative, a removable or rupturable seal over exposed ends of the ports 7 and 13 can be used, for example a peel-off film could be used as sold under the brand name ReadyMate by GE Healthcare. In this way the column assembly can be shipped to the customer and can be connected to the customer's equipment without the risk of contamination. The column packing apparatus can be reused (discarding the extension tube 21) by connecting a fresh unfilled column assembly onto the connectors 33,35,37 and 39, ready for the next packing procedure, again with minimum risk of contamination.

Also according to the invention, a chromatography column packing apparatus for filling a chromatography column 1 with chromatography media and compressing the media is provided. The apparatus is shown in FIGS. 1a and 1b and comprises a column tube 3 having a closed first end 5 comprising an inlet/outlet 7, and a media inlet 15 adjacent a second end 6 of the column tube 3 connectable to a media slurry source. The apparatus comprises further an adaptor 9 positionable in a first position inside the column tube 3 adjacent the second end 6 of the column tube 3 for sliding and sealing contact with an inner face of the column tube. The column tube 3 and adaptor 9 when arranged in said first position define an internal volume where the media inlet 15 is in fluid connection with the internal volume. The adaptor is moveable at least to a second position to reduce the internal volume, in which second position the media inlet 15 is no longer in fluid connection with the reduced internal volume.

In one embodiment of the invention the column tube 3 comprises an extension tube wall 21 comprising the media inlet 15 connected to a basic column tube wall 19 comprising the closed first end 5 and wherein the first position of the adaptor is within the extension tube wall 21 and the second position of the adaptor 9 is within the basic column tube wall 19.

Embodiments of the invention provide a system which remains substantially closed whilst within a controllable environment, and which allows disconnection at a predefined connection points only, such that the risk of contamination is minimized.

The invention claimed is:

1. A method for packing a chromatography column assembly with chromatography media, comprising the steps of:
   providing:
      a column tube having a closed first end comprising an end inlet/outlet,
      a media inlet adjacent a second end of the column tube,
      an air outlet adjacent the second end of the column tube, and
      an adaptor positioned inside the column tube initially adjacent the second end of the column tube configured for sliding and sealing contact with an inner face of the column tube, the column tube and the adaptor arranged initially such that they define an internal volume and such that the media inlet is in fluid connection with the internal volume, wherein the column tube comprises an extension tube wall adjacent the second end connected to a basic column tube wall adjacent the first end, and both the extension tube wall and the basic column tube wall have essentially the same inner diameters;

connecting a media slurry source to the media inlet;

filling the internal volume with media slurry via the media inlet by filling the internal volume with an exact amount of the media slurry or filling the internal volume with the media slurry until the media slurry starts to flow out from the air outlet;

forcing the adaptor towards the first end of the column tube beyond the media inlet and beyond the extension tube wall connection to the basic column tube wall to reduce the internal volume such that the media inlet is no longer in fluid connection with the reduced internal volume;

after forcing the adaptor, securing the adaptor to the basic column tube wall; and then separating the extension tube wall from the basic column tube wall;

wherein forcing the adaptor is effective to compress the media slurry, such that the media slurry remains compressed while securing the adaptor to the basic column tube wall and separating the extension tube wall from the basic column tube wall.

2. The method accordingly to claim 1, wherein the adaptor comprises an adaptor inlet/outlet.

3. The method according to claim 2, further comprising providing the system and the media slurry as pre-sterilized and providing aseptic and/or sanitary connectors to the media inlet, the end inlet/outlet and/or the adaptor inlet/outlet.

4. The method according to claim 1, wherein the step of forcing the adaptor towards the first end comprises forcing the adaptor to a position within the basic column tube wall but outside the extension tube wall and the step of separating the extension tube wall comprises disconnecting the extension tube wall from the basic column tube wall.

5. The method according to claim 1, further comprising the step of calculating a position where the adaptor should be stopped and secured to the column tube after having been forced towards the first end by using the media slurry concentration, the amount of the media slurry filled into the system and a wanted compression factor.

6. The method according to claim 1, further comprising the step of adjusting a volume and/or a concentration of the media slurry filled into the internal volume of the system based on input of a wanted position where the adaptor should be stopped and secured to the column tube after having been forced towards the first end and/or a wanted compression factor.

7. The method according to claim 1, further comprising the steps of:

providing a column assembly packing apparatus including one or more closeable connectors at the end of one or more respective fluid paths, the one or more connectors being complementary at least to the end inlet/outlet; and disconnecting said one or more connectors at the end of the forcing the adaptor step to leave respective closed fluid paths at the packing apparatus.

8. The method of claim 2, further comprising the steps of:

providing a column assembly packing apparatus including one or more closeable connectors at the end of one or more respective fluid paths, the one or more connectors being complementary at least to the end inlet/outlet or the adaptor inlet/outlet;

disconnecting said one or more connectors at the end of the forcing the adaptor step to leave respective closed fluid paths at the packing apparatus; and providing one or more closeable elements at one or more of the end inlet/outlet, the adaptor inlet/outlet or at any other inlet/outlet in the chromatography assembly.

* * * * *